United States Patent [19]
Young

[11] Patent Number: 5,634,683
[45] Date of Patent: Jun. 3, 1997

[54] SLIDEOUT ROOM FOR VEHICLE

[76] Inventor: James Young, R.R. 1, Box 148A, El Paso, Ill. 61738

[21] Appl. No.: 598,349

[22] Filed: Feb. 8, 1996

[51] Int. Cl.$^6$ ............................................. B60D 3/34
[52] U.S. Cl. ................. 296/165; 296/175; 296/176; 52/67
[58] Field of Search ..................... 296/165, 171, 296/172, 175, 176, 26; 52/67

[56] References Cited

U.S. PATENT DOCUMENTS

| | | |
|---|---|---|
| Re. 32,262 | 10/1986 | Stewart . |
| 2,739,833 | 3/1956 | Shenkel et al. ............... 52/67 |
| 2,744,781 | 5/1956 | Black ........................... 296/171 |
| 2,877,509 | 3/1959 | Klibanow ..................... 296/171 |
| 3,341,986 | 9/1967 | Brosig ........................... 52/67 |
| 4,128,269 | 12/1978 | Stewart . |
| 4,253,283 | 3/1981 | May . |
| 5,237,782 | 8/1993 | Cooper ......................... 296/171 |
| 5,248,180 | 9/1993 | Hussaini ...................... 296/171 |

FOREIGN PATENT DOCUMENTS 882258  11/1961  United Kingdom .................... 296/26

*Primary Examiner*—Gary C. Hoge
*Attorney, Agent, or Firm*—Emrich & Dithmar

[57] ABSTRACT

An extendible slideout room having a roof, floor, and sidewalls is moveable between a retracted position and an extended position within a lateral wall of a vehicle such as a motorhome, a boat, or virtually any type of trailer. In the retracted position, the roof, floor and two side walls of the slideout room are disposed within the vehicle, with a third outer side wall positioned in sealed contact with the vehicle's lateral wall about the periphery of the slideout room. When extended, the slideout room's roof, floor and sidewalls project outwardly from the vehicle's lateral wall in sealed contact with the vehicle's wall. Elongated screws rotationally coupled to the slideout room's outer side wall at their respective distal ends are inserted through respective threaded fittings fixedly attached to the vehicle's lateral wall, with each screw disposed adjacent a respective corner of the room. A toothed sprocket is attached to the distal end of each screw, with the sprockets coupled together by means of an endless chain. A drive sprocket connected to a drive motor is also coupled to the chain for displacing the chain and rotating the screws in unison. Rotation of the drive sprocket in a first direction extends the slideout room, while rotation of the drive sprocket in a second, opposed direction retracts the room within the vehicle. The drive mechanism including motor, sprockets and chain are coupled to and move with the slideout room during extension and retraction.

16 Claims, 4 Drawing Sheets

SLIDEOUT ROOM FOR VEHICLE

FIELD OF THE INVENTION

This invention relates generally to vehicles and is particularly directed to extensible slideout rooms for a vehicle such as a motorhome, a boat, or virtually any type of trailer.

BACKGROUND OF THE INVENTION

Recreation vehicles including motor homes and travel trailers are frequently provided with an extensible slideout room for increasing the vehicle's living space. The slideout room is extended for use when the vehicle is parked and is retracted in a telescoping manner when the vehicle is to be moved. Prior slideout room installations include an extension/retraction system disposed in the recreation vehicle which pushes and pulls the slideout room during extension and retraction. The extension/retraction system is typically attached to either a lower portion of the slideout room adjacent its floor or to an upper portion of the slideout room adjacent its roof. In either case, considerable force is required to extend and retract the slideout room. In addition, it is difficult to establish a good seal between the lateral wall of the recreation vehicle and the outer periphery of the slideout room when extended or retracted to prevent water leaks. Moreover, prior extension/retraction systems for slideout rooms have been overly complex and have required extensive modification to the recreation vehicle in which the slideout room is incorporated.

The present invention addresses the aforementioned limitations of the prior art by providing a slideout room installation for a vehicle such as recreation vehicle or a boat wherein the extension/retraction force is applied about the entire periphery of the slideout room, the extension/retraction mechanism is disposed entirely within and moves with the slideout room, and minimal modification of the recreation vehicle is required for installation of the slideout room.

OBJECTS AND SUMMARY OF THE INVENTION

Accordingly, it is an object of the present invention to provide a slideout room for a vehicle such as a motorhome, a boat, or virtually any type of trailer.

It is another object of the present invention to engage, support and displace a slideout room for a vehicle about its entire periphery which allows for extending and retracting the slideout room with reduced power and affords an enhanced sealing force between the vehicle and the room when either extended or retracted.

Yet another object of the present invention is to evenly distribute an extension/retraction force on a moveable slideout room of a vehicle about the entire periphery of the slideout room.

A further object of the present invention is to apply a retraction force to an extendible slideout room at the seal of the slideout room with the vehicle to which it is attached.

A still further object of the present invention is to provide a slideout room installation for a vehicle which employs a minimum number of components and requires minimal modification of the vehicle for economical manufacture and installation.

This invention contemplates an arrangement for use in a vehicle having a plurality of first side walls, the arrangement comprising a slideout room disposed in an opening in one of the first side walls and including a floor, a ceiling, an end wall and a plurality of second side walls, the slideout room further including a plurality of corners defined by intersections of the floor and the ceiling with each of the second side walls; a plurality of elongated screws each having a respective longitudinal axis oriented generally perpendicular to one of the first side walls of the vehicle with each of the screws further including a distal end coupled to the end wall of the slideout room and a proximal end disposed in the vehicle; a plurality of threaded fittings attached to the one of the first side walls of the vehicle about the aperture therein, wherein each of the screws is threadably inserted in a respective one of the fittings; a plurality of sprockets coupled by means of an endless chain, wherein each of the sprockets is fixedly mounted to a distal end of a respective one of the screws; and a drive system coupled to the endless chain for displacing the chain and rotating each sprocket and screw combination in a first direction for retracting the slideout room within the vehicle through the aperture therein or for rotating each sprocket and screw combination in a second, opposed direction for extending the slideout room out of the vehicle through the aperture therein, wherein the drive system is coupled to and moves with the slideout room.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
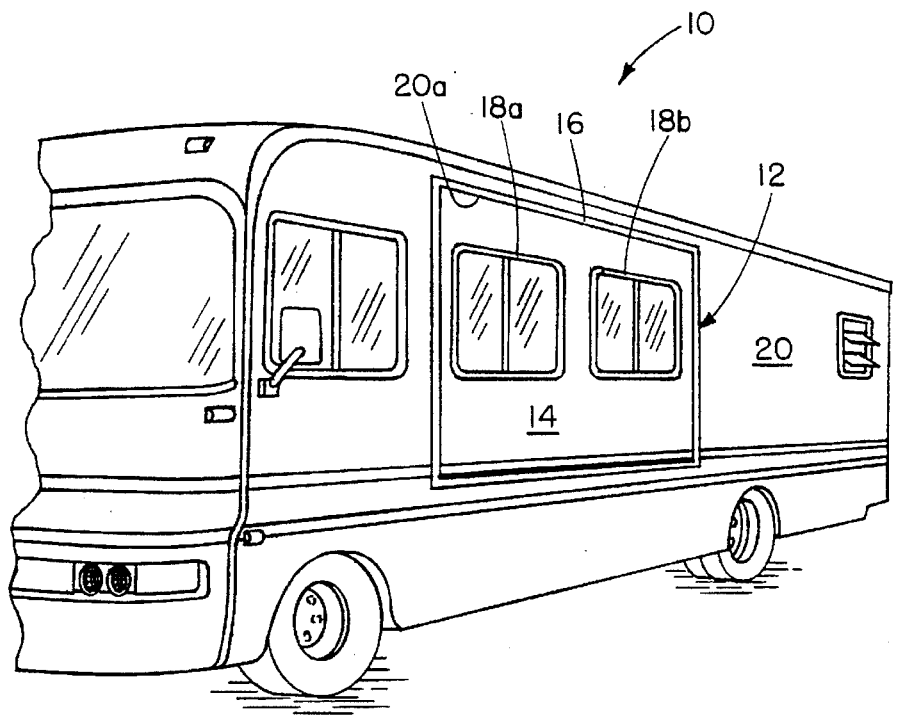
FIG. 1 is a partial perspective view of a recreation vehicle incorporating a slideout room in accordance with the present invention illustrating the slideout room in the retracted position.
Figure 2:
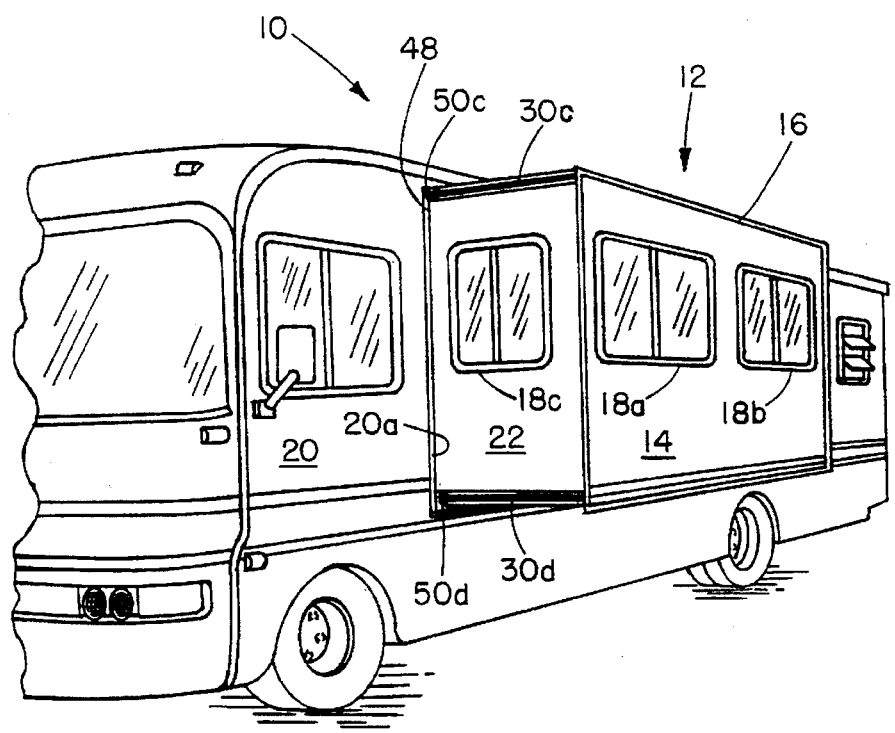
FIG. 2 is a perspective view of a recreation vehicle incorporating a slideout room in accordance with the present invention illustrating the slideout room in the extended position.

Referring to FIGS. 1 and 2, there are shown partial side perspective views of a recreation vehicle 10 incorporating a slideout room 12 respectively shown in the retracted and extended positions in accordance with the present invention. Slideout room 12 is moveable disposed in an opening 20a in the vehicle's side wall 20. While the recreation vehicle 10 is shown in the figures in the form of a motor home, the slideout room of the present invention may also be incorporated in other types of recreation vehicles such as travel trailers.

Figure 4:
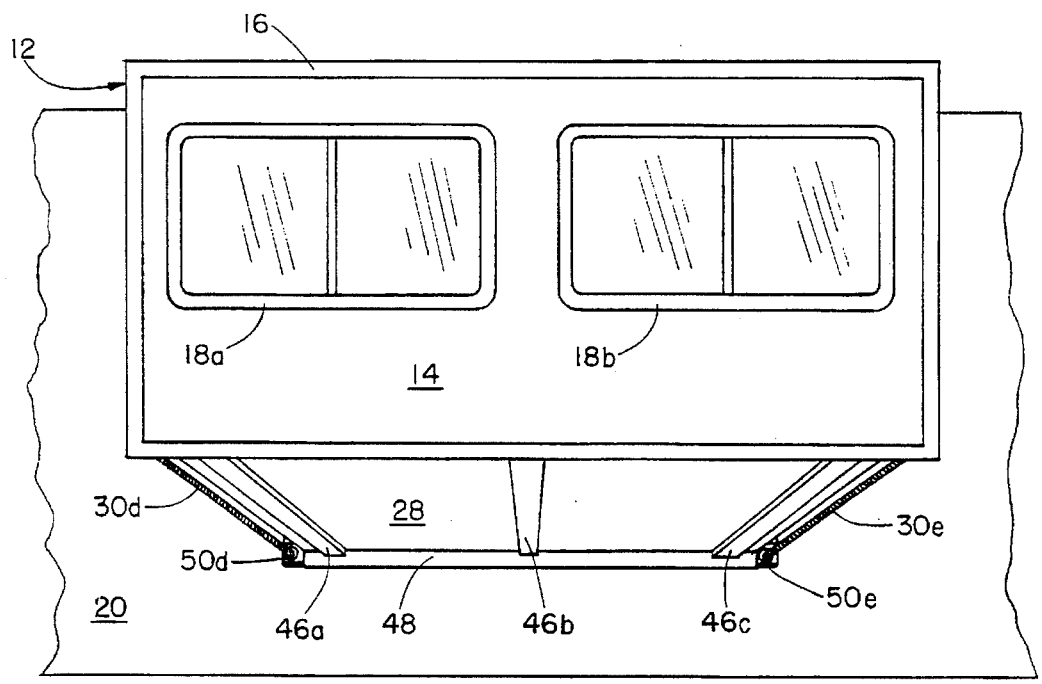
FIG. 4 is a perspective view illustrating a lower, outer portion of the slideout room with the room in the extended position.
Figure 5:
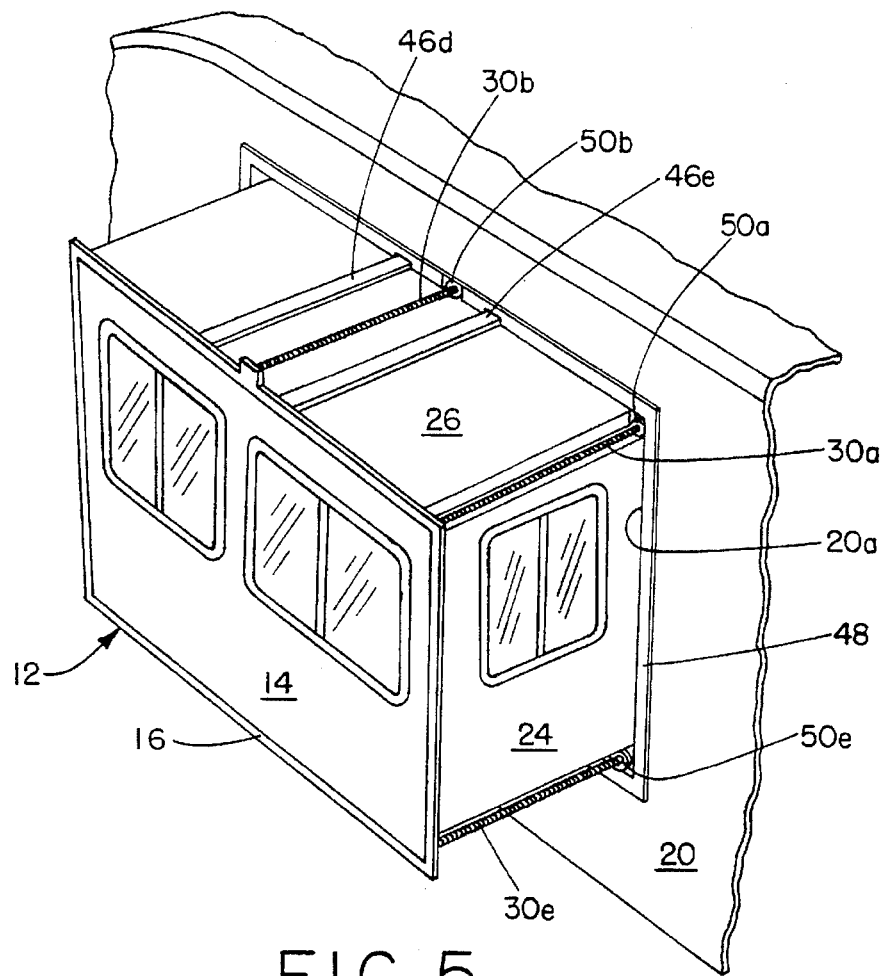
FIG. 5 is an upper partial perspective view of a recreation vehicle incorporating a slideout room in accordance with the present invention where the slideout room is illustrated in the extended position.

With reference also to FIGS. 4 and 5 which are respectively lower and upper perspective views of the slideout room 12 extending from the recreation vehicle 10, additional details of the inventive slideout room and extension/retraction system therefor will now be described. Slideout room 12 includes first and second side walls 22 and 24, an end wall 14, a roof portion 26, and a floor portion 28. Respectively disposed in the first and second side walls 22, 24 are windows 18c and 18d. Similarly, disposed in the slideout room's end wall 14 are windows 18a and 18b. Disposed about the opening 20a in the vehicle's sidewall 20 is a first seal or gasket 48. Similarly, disposed about the periphery of the slideout room's end wall 14 is a second seal 16. When the slideout room 12 is retracted into the recreation vehicle 10, second seal 16 is in intimate contact with the first seal 48 to provide a watertight seal between the slideout room and the recreation vehicle's side wall 20. Disposed about the inner periphery of the slideout room 12 is a metal frame 62 which serves as a seal about the periphery of the slideout room when fully extended.

Figure 6:
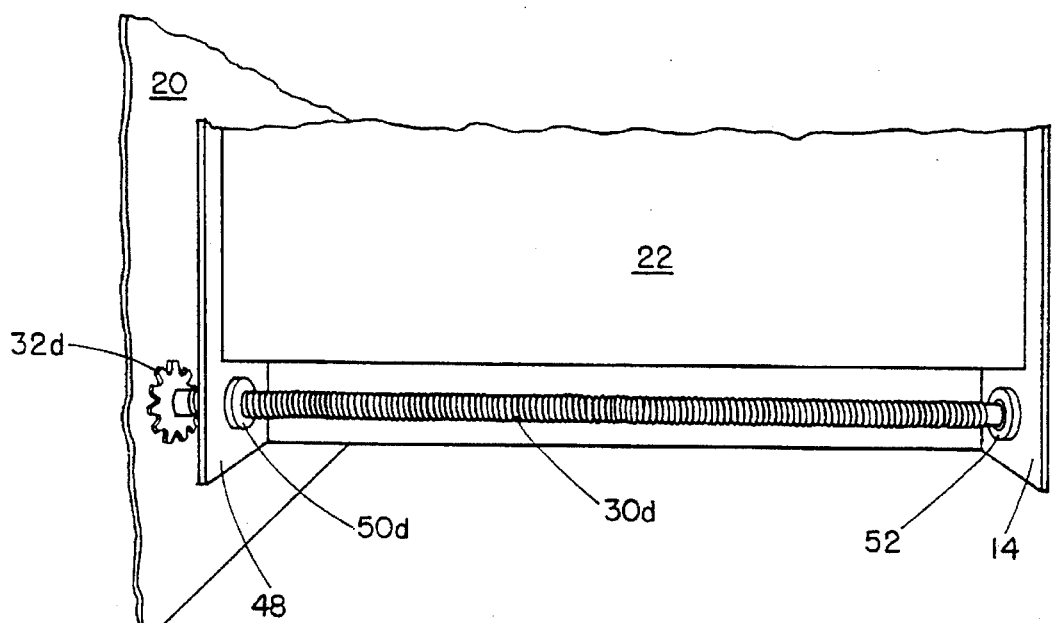
FIG. 6 is a perspective view of an outer corner of the slideout room shown in FIGS. 4 and 5 illustrating details of a portion of the room extension/retraction system of the present invention.

In accordance with the present invention, an elongated screw is disposed at each corner of the slideout room 12 as well as adjacent the center of the room's roof portion 26. Thus, screws 30a, 30c, 30d and 30e are disposed adjacent respective outer corners of the slideout room 12, while a fifth screw 30b is disposed adjacent the center of the slideout room's roof portion 26. The distal ends of each of the elongated screws 30a–30e are each pivotally coupled to the slideout room's end wall 14 to allow for free rotation of the screws. This is shown for the case of screw 30d in the perspective view of a lower, outer corner portion of the slideout room of FIG. 6. The distal end of screw 30d is inserted in and coupled to a retainer fitting 52 disposed in the slideout room's end wall 14. Screw 30d is freely rotatable within retainer fitting 52 which is securely and fixedly attached to the slideout room's end wall 14. Attached to the proximal end of each of the screws is a toothed sprocket as shown for the case of sprocket 32d disposed on the proximal end of screw 30d. Each of the screws is also inserted through a respective threaded fitting which is inserted through the peripheral inner seal 48 and is fixedly mounted to the recreation vehicle's sidewall 20. Thus, screws 30a–30e are respectively inserted through threaded fittings 50a–50e. It should be noted that screw 30b disposed adjacent the centerline of the slideout room's roof portion 26 is required for larger slideout rooms such as when the slideout room's length exceeds eight feet. For slideout rooms smaller than eight feet in length, a screw disposed adjacent each corner of the slideout room provides sufficient support for the slideout room during extension and retraction, as well as while extended. Also, while the slideout room 12 is shown as having a generally rectangular cross sectional shape, the extension/retraction system of the present invention will operate equally as well with a slideout room of virtually any shape by placing a displacement screw adjacent each corner of the room as well as between adjacent corners of the room when required by slideout room size. Finally, disposed on the floor portion of the slideout room 12 are three spaced nylon slides 46a, 46b and 46c to facilitate sliding displacement of the room out of and into the recreation vehicle. Nylon slides 46a, 46b and 46c also provide additional support for the slideout room's floor portion 28. Similarly, disposed on the roof portion 26 of the slideout room 12 are a pair of spaced nylon slides 46d and 46e which also facilitate sliding extension and retraction of the slideout room 12.

Figure 3:
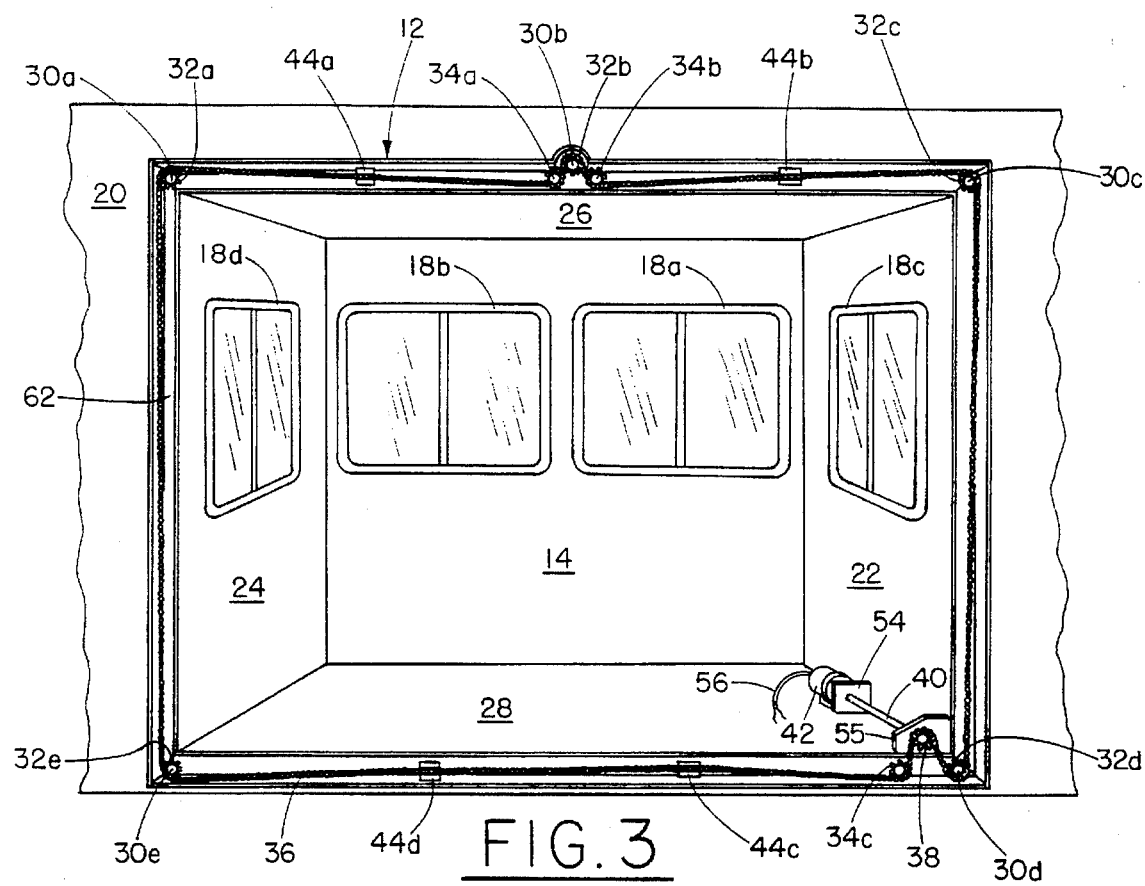
FIG. 3 is an elevation view of the inside of a slideout room illustrating details of the room's extension/retraction system in accordance with the present invention.
Figure 9:
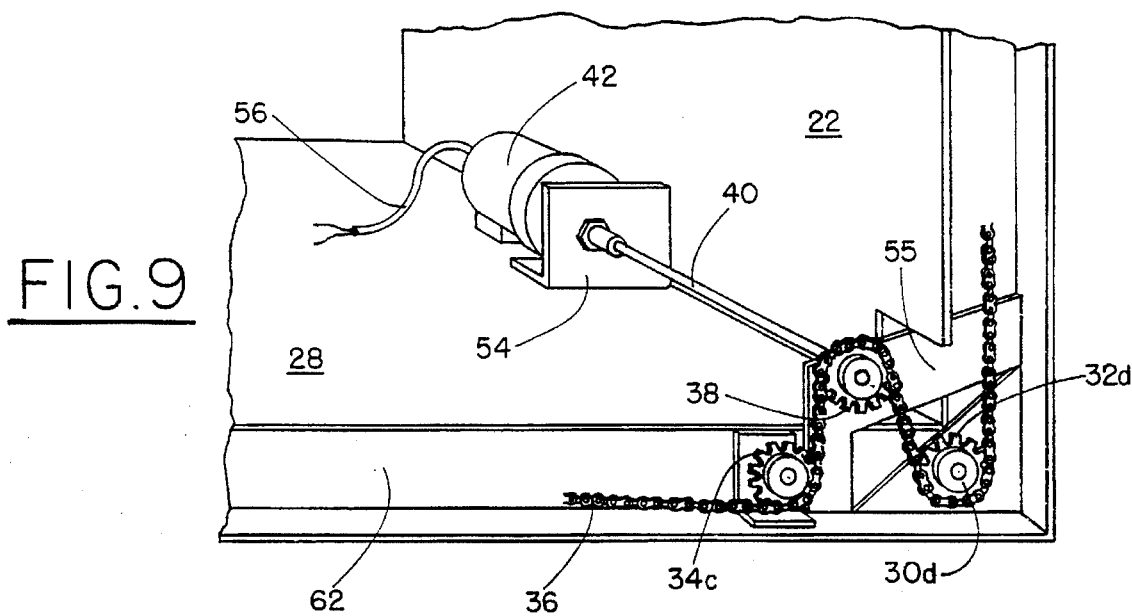
FIG. 9 is a partial perspective view of an inner portion of the slideout room of the present invention illustrating additional details of its extension/retraction system.

Referring to FIG. 3, there is shown a perspective view of an inner portion of the slideout room illustrating additional details of the room extension/retraction system. As previously described, attached to the proximal end of each of the screws is a respective toothed sprocket. Thus, respectively attached to the proximal ends of screws 30a, 30b, 30c, 30d and 30e are sprockets 32a, 32b, 32c, 32d and 32e. Each sprocket is fixedly attached to a respective screw so that rotation of the sprocket causes a corresponding rotation of the screw attached to it. Disposed about the inner periphery of the slideout room 12 is the aforementioned metal frame 62. Each screw extends through the slideout room's peripheral metal frame 62 as well as through an adjacent portion of the recreation vehicle's sidewall 20. Disposed about and engaging sprockets 32a–32e is an endless chain 36. Also engaging endless chain 36 are a first pair of idler sprockets 34a and 34b disposed adjacent to the uppermost, center sprocket 32b. Also engaging the endless chain 36 is a third idler sprocket 34c disposed adjacent sprocket 32d. Disposed adjacent and intermediate sprocket 32d and idler sprocket 34c is a drive sprocket 38 as shown in the partial perspective view of FIG. 9. Drive sprocket 38 is coupled to a distal end of a drive shaft 40 and rotates with the drive shaft. Drive shaft 40 is, in turn, coupled to a drive motor 42 which is attached to a power source such as a storage battery (not shown on the figures for simplicity) by means of electrical leads 56. The combination of electric motor 42 and drive shaft 40 is mounted to an inner portion of the slideout room 12 by means of the combination of the first and second mounting brackets 54 and 55. Electric motor 42 rotationally displaces the combination of drive shaft 40 and drive sprocket 38 which, in turn, displaces the endless drive chain 36. With the endless drive chain 36 disposed about sprockets 32a–32e and with each of these sprockets fixedly attached to respective proximal ends of screws 30a–30e, drive motor 42 simultaneously rotates all of the screws in one direction.

With each of the screws inserted through a respective threaded fitting mounting in the recreation vehicle's sidewall 20, rotation of the screws in a first direction will cause the slideout room 12 to be extended from the recreation vehicle 10, while rotation of the screws in a second, opposed direction will cause the slideout room to be retracted within the recreation vehicle. During extension and retraction of the slideout room 12, the drive motor 42, drive shaft 40 and all of the aforementioned sprockets and screws as well as the endless chain 36 move with the slideout room. Nylon chain guides 44a, 44b, 44c and 44d are attached to the slideout room's inner peripheral metal frame 62 and engage the endless chain 36 for maintaining the endless chain aligned with the sprockets. Changing the position of the guides 44a–44d along the inner peripheral metal frame 62 permits the tension of the endless chain 36 to be adjusted for the purpose of taking up any slack in the chain which may appear after extended use.

Figure 7:
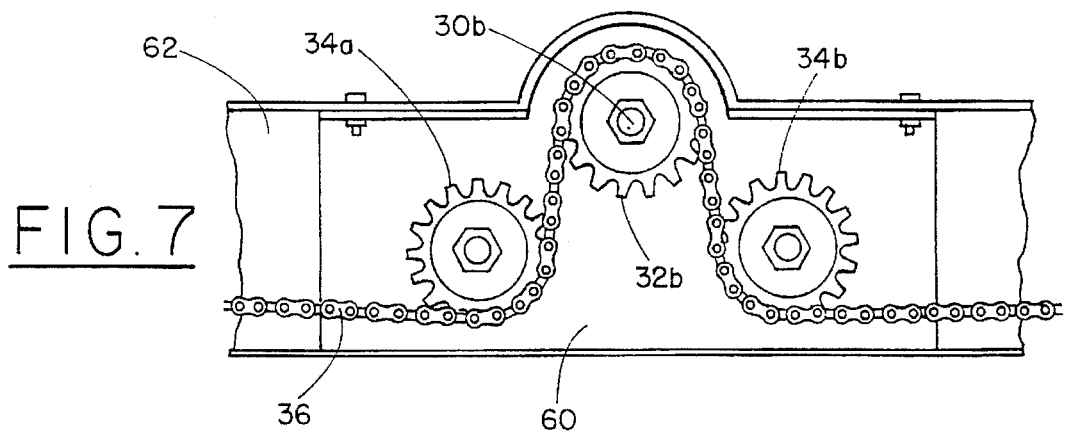
FIG. 7 and 8 are elevation views illustrating portions of the slideout room extension/retraction system of the present invention.
Figure 8:
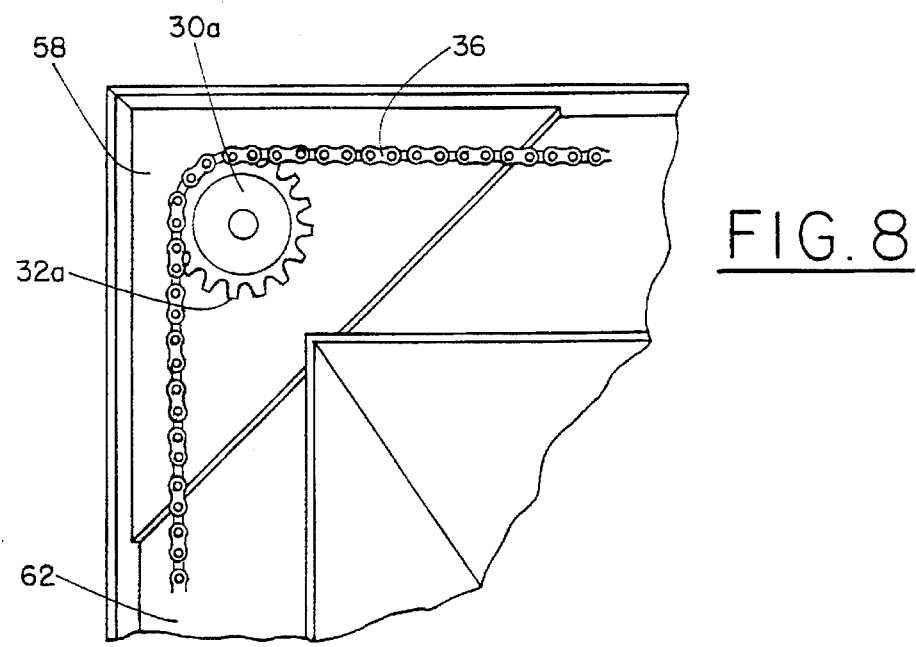

Referring to FIGS. 7 and 8, there are shown additional details of the sprocket and drive chain installation. In FIG. 7, the uppermost, center sprocket 32b is shown attached to the distal end of screw 30b. The first and second idler sprockets 34a and 34b are disposed on respective sides of sprocket 32b and maintain the endless chain 36 wrapped around sprocket 32b. A mounting bracket 60 attached to the inner peripheral metal frame 62 maintains the combination of screw 30b and sprocket 32b in fixed position relative to idler sprockets 34a, 34b and their respective support shafts. In FIG. 8, there is shown a corner reinforcing bracket 58 attached to the inner peripheral metal frame 62 for securely maintaining the combination of screw 30a and sprocket 32a in fixed position relative to the endless chain 36 which is disposed about the sprocket. A similar reinforcing bracket is disposed in each corner of inner peripheral metal frame 62 for receiving and supporting a screw and sprocket combination.

There has thus been shown a slideout room for a recreation vehicle and an extension/retraction system therefore. The slideout room includes a plurality of elongated screws, each disposed adjacent a respective corner of the room, which when rotated in a first direction retract the room into the recreation vehicle and when rotated in a second, opposed direction extend the room out from the recreation vehicle. The distal end of each elongated screw is attached to an end, or outer, wall of the slideout room, while the proximal end of each screw is disposed within the recreation vehicle and has attached thereto a respective sprocket. Each screw is further inserted in a threaded fitting attached to the recreation vehicle's side wall, with the screws disposed about the opening in the vehicle's sidewall through which the slideout room extends. The screw-mounted sprockets engage and are coupled by means of an endless chain which further engages a drive sprocket and electric motor combination for rotating the screws in a first direction for extending the slideout room or rotating the screws in a second, opposed direction for retracting the room into the recreation vehicle. The slideout room extension/retraction system is located entirely within the slideout room and moves with the room during extension and retraction. Additional screw and sprocket combinations may be located about the opening in the recreation vehicle's side wall for larger slideout rooms, i.e., those greater than eight feet in length. Elongated nylon slide members are attached to upper and lower outer portions of the slideout room to facilitate sliding displacement of the room through the aperture in the recreation vehicle's side wall. By applying the extension and retraction force about the entire periphery of the slideout room, less force is required for displacing the room and a tighter seal is established between the room and the recreation vehicle's sidewall when the room is fully extended or retracted.

While particular embodiments of the present invention have been shown and described, it will be obvious to those skilled in the art that changes and modifications may be made without departing from the invention in its broader aspects. Thus, while the present invention has been disclosed and illustrated in terms of being installed in a motorhome, the present invention is not limited to this type of vehicle, but may be installed in virtually any type of trailer, including travel, horse, race car and hospital trailers, as well as in boats. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. For use in a vehicle having a plurality of first side walls, an arrangement comprising:

a slideout room disposed in an opening in one of said first side walls and including a floor, a ceiling, an end wall and a plurality of second side walls, said slideout room further including a plurality of corners defined by intersections of said floor and said ceiling with each of said second side walls;

a plurality of elongated screws each disposed adjacent a respective corner of said slideout room and having a respective longitudinal axis oriented generally perpendicular to said one of said first side walls of the vehicle, each of said screws further including a distal end coupled to the end wall of said slideout room and a proximal end disposed in the vehicle;

a plurality of threaded fittings attached to said one of said first side walls of the vehicle about the aperture therein, wherein each of said screws is threadably inserted in a respective one of said fittings;

a plurality of sprockets coupled by means of an endless chain, wherein each of said sprockets is fixedly mounted to a proximal end of a respective one of said screws;

drive means coupled to said endless chain for displacing said chain and rotating each sprocket and screw combination in a first direction for retracting said slideout room within the vehicle through the aperture therein or for rotating each sprocket and screw combination in a second, opposed direction for extending said slideout room out of the vehicle through the aperture therein, wherein said drive means is coupled to and moves with said slideout room; and a plurality of slide members extending between the distal and proximal portions of said slideout room for engaging said one of the vehicle's first side walls adjacent the aperture therein for facilitating sliding displacement of the slideout room between the extended and retracted positions.

2. The arrangement of claim 1 further comprising a plurality of retainer fittings each coupled to a distal end of a respective screw and attached to the end wall of said slideout room.

3. The arrangement of claim 1 further comprising a first seal member attached to said one of first side walls of the vehicle and disposed about the aperture therein, and a second seal member disposed about a periphery of the end wall of said slideout room for engaging said first seal member when said slideout room is fully retracted.

4. The arrangement of claim 3 further comprising a third seal member disposed about a proximal periphery of said slideout room for engaging said first seal member when said slideout room is fully extended.

5. The arrangement of claim 1 further comprising an elongated screw and sprocket combination disposed adjacent the ceiling of said slideout room and midway between opposed side walls of said slideout room and coupled to said drive means by means of said endless chain.

6. The arrangement of claim 5 further comprising first and second idler sprockets engaging said endless chain and disposed adjacent to said screw and sprocket combination.

7. The arrangement of claim 1 wherein said drive means includes a drive motor and drive sprocket combination coupled to said endless chain for rotationally displacing said sprocket and screw combinations.

8. The arrangement of claim 7 further comprising an idler sprocket engaging said endless chain and disposed adjacent of said drive sprocket and one of said sprockets mounted to a screw.

9. The arrangement of claim 8 further comprising a plurality of chain guides disposed on a proximal portion of said slideout room and engaging said endless chain for maintaining said chain aligned with said sprockets and under tension.

10. For use in a vehicle having an extendible slideout room, wherein said slideout room includes a floor, a ceiling, an end wall, and a plurality of side walls, an arrangement for displacing said slideout room through an aperture in a lateral wall of the vehicle between an extended position and a retracted position, said arrangement comprising:

a plurality of elongated screws disposed in a spaced manner about the periphery of the slideout room with each of said screws including a distal end coupled to the slideout room and a proximal end disposed in the vehicle and having a sprocket attached thereto, wherein each of said screws is inserted through and threadably coupled to the lateral wall of the vehicle;

an endless chain engaging each of said sprockets disposed on the distal ends of said screws;

drive means coupled to said endless chain for rotating said sprocket and screw combinations in a first direction for extending the slideout room from the vehicle through the aperture in the lateral wall of the vehicle or for rotating said sprocket and screw combinations in a second, opposed direction for retracting the slideout room into the vehicle; and a plurality of slide members for engaging the lateral wall of the vehicle adjacent the aperture therein for facilitating sliding displacement of the slideout room between the extended and retracted positions.

11. The arrangement of claim 10 further comprising a plurality of retainer fittings each coupled to a distal end of a respective screw and attached to the end wall of said slideout room.

12. The arrangement of claim 11 further comprising an elongated screw and sprocket combination disposed adjacent the ceiling of said slideout room and midway between opposed side walls of said slideout room and coupled to said drive means by means of said endless chain.

13. The arrangement of claim 12 further comprising first and second idler sprockets coupled to said endless chain and disposed to adjacent to said screw and sprocket combination.

14. The arrangement of claim 13 wherein said drive means includes a drive motor and drive sprocket combination coupled to said endless chain for rotationally displacing said sprocket and screw combinations.

15. The arrangement of claim 14 further comprising an idler sprocket engaging said endless chain and disposed adjacent said drive sprocket and one of said sprockets mounted to a screw.

16. The arrangement of claim 15 further comprising a plurality of chain guides disposed on a proximal portion of said slideout room and engaging said endless chain for maintaing said chain aligned with said sprockets and under tension.

\* \* \* \* \*